US008386507B2

(12) United States Patent
Puranik et al.

(10) Patent No.: US 8,386,507 B2
(45) Date of Patent: *Feb. 26, 2013

(54) EFFICIENT CACHING FOR DYNAMIC WEBSERVICE QUERIES USING CACHABLE FRAGMENTS

(75) Inventors: Rajiv Puranik, Cupertino, CA (US); Jay Ramamurthi, San Jose, CA (US); ChyrSong Ting, San Marcos, CA (US); Scott Haynie, Santa Monica, CA (US); Timothy R. McCune, Santa Monica, CA (US); Sandeep Kumar, Issaquah, WA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,746

(22) Filed: May 11, 2011

(65) Prior Publication Data
US 2011/0270989 A1 Nov. 3, 2011

Related U.S. Application Data

(63) Continuation of application No. 12/273,504, filed on Nov. 18, 2008, now Pat. No. 7,962,502.

(51) Int. Cl.
*G06F 17/30* (2006.01)
(52) U.S. Cl. ...................................................... 707/759
(58) Field of Classification Search .......... 707/662–666, 707/689, 693, 694, 758–760
See application file for complete search history.

(56) References Cited

U.S. PATENT DOCUMENTS

| 5,062,055 | A | 10/1991 | Chinnaswamy et al. |
| 6,128,623 | A | 10/2000 | Mattis et al. |
| 6,249,844 | B1 | 6/2001 | Schloss et al. |
| 6,289,358 | B1 | 9/2001 | Mattis et al. |
| 6,725,265 | B1 | 4/2004 | Challenger et al. |
| 6,728,840 | B1 | 4/2004 | Shatil et al. |
| 7,320,007 | B1 | 1/2008 | Chang |
| 7,555,757 | B2 * | 6/2009 | Smith et al. .................... 719/328 |
| 7,707,182 | B1 * | 4/2010 | Kee et al. ....................... 707/638 |
| 7,756,922 | B2 * | 7/2010 | Basu et al. .................... 709/203 |
| 7,792,836 | B2 * | 9/2010 | Taswell ......................... 707/737 |
| 7,840,547 | B1 | 11/2010 | Tucker et al. |
| 2008/0126406 | A1 * | 5/2008 | Endabetla et al. ......... 707/103 R |
| 2008/0201413 | A1 * | 8/2008 | Sullivan et al. ................ 709/203 |
| 2010/0057895 | A1 * | 3/2010 | Huang ........................... 709/222 |

* cited by examiner

*Primary Examiner* — Cam-Linh Nguyen
(74) *Attorney, Agent, or Firm* — Hickman Palermo Truong Becker Bingham Wong LLP

(57) ABSTRACT

A method and apparatus for intelligent caching is provided. A thin layer of business logic on a web server receives URL requests sent to the web server from clients and resolves the URLs into URLs corresponding to component parts of the requested document according to the rules of a rule set. Thus only the component resources of a composite document are cached in the web server's caching layer. The rule set defines a format for the requests sent to the web server, the manner in which properly formatted requests should be resolved, and the manner in which the component resources should be assembled into the composite document.

20 Claims, 7 Drawing Sheets

FIG. 3C

A Cactus Blooms —301  302

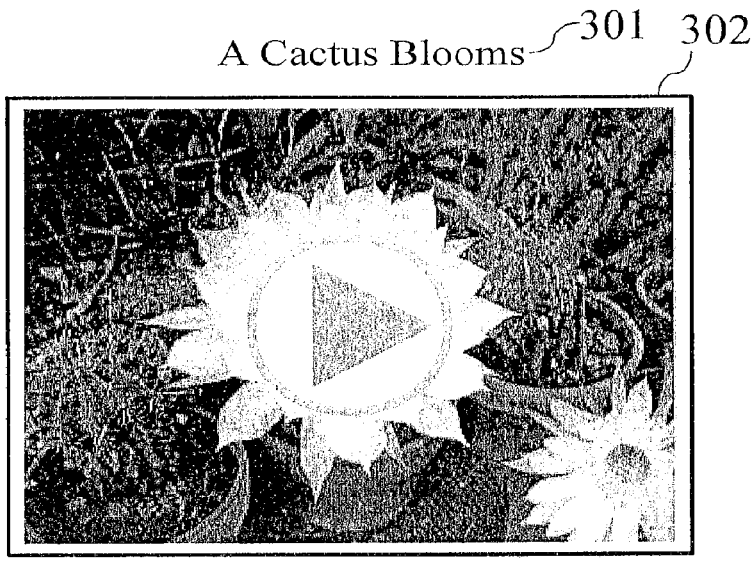

"A Cactus Blooms" is a documentary highlighting the beauty of the desert. It is said that the desert is the mirror of the soul; that those who live in the desert see in the landscape the beauty or barrenness of their own being. This documentary shows the desert at its most stunning and terrible forms, walking the viewer through the most remote and mysterious deserts in all the world.

330

EFFICIENT CACHING FOR DYNAMIC WEBSERVICE QUERIES USING CACHABLE FRAGMENTS

RELATED CASES

This application is a continuation of U.S. patent application Ser. No. 12/273,504, filed Nov. 18, 2008, now U.S. Pat. No. 7,962,502, which is incorporated by reference as if fully set forth herein under 35 U.S.C. §120.

FIELD OF THE INVENTION

The present invention relates to caching resources at a web server, and, more specifically, to techniques for using an Application Programming Interface to cache component resources comprising a composite resource.

BACKGROUND

The Internet is a powerful tool for disseminating information. Many times, the information that can be found on the Internet is in the form of documents composed of many component resources. When a composite document—non-limiting examples of which are a HyperText Markup Language (HTML) document, an Extensible Markup Language (XML) document, a Wireless Markup Language (WML) document, a compact HyperText Markup Language (cHTML) document, or an Extensible HyperText Markup Language (XHTML)—is requested by a particular client, generally the requested document is compiled by web applications and sent to the client via a web server. Clients can be browser-based or clients can comprise non-browser applications that have the capability to request information over the Internet.

Fig. 1A illustrates a typical system 100 through which information is delivered to clients over the Internet. For example, client 101 requests a particular document over the Internet 102 using a Uniform Resource Locator (URL) corresponding to the document. Components within the Internet 102 locate the address in the URL and make a request to an appropriate web server 104. In response to the request, web server 104 checks its cache layer 103 to see if the resource being requested is in cache layer 103. If the resource is in cache layer 103, then web server 104 returns the resource from cache layer 103 without any more processing. However, if the resource is not in cache layer 103, then web server 104 makes a request to an appropriate application 120. Application 120 may access a database 130 or 131 in order to compile the resource in response to the server's request. Accessing a persistent store such as database 130 or 131 is best minimized because such access is computationally expensive and prone to latency. It will be apparent to those of skill in the art that systems for delivering information over the Internet can be configured in many different ways As illustrated in FIG. 1B, an example cache layer 103 associated with web server 104 stores several documents 111-114. Each of these documents 111-114 is stored for an amount of time that is negotiated by web server 104 and web application 120, which is called Time To Live (TTL). Once a document has been stored in cache layer 103 for longer than the document's TTL, the document is considered expired. An expired document is evicted from the cache. After a resource, such as a document, has been evicted in this way, a request for the resource must go through the web application 120. Documents in the cache generally are indexed in cache layer 103 by each document's URL.

For example, a request for a document with the URL "URL1" might be sent to web server 104 from a client, such as client 101 of FIG. 1A. Cache layer 103 associated with web server 104 has cached resources 111-114 that have not expired and that are associated with "URL1," "URL2," "URL3," and "URL4," respectively. Web server 104 sends "URL1" into cache layer 103 to check if resource 111, associated with "URL1," is in cache layer 103 and unexpired. Because cache layer 103 has an unexpired copy of cached resource 111 associated with "URL1," web server 104 simply returns resource 111 to the client from cache layer 103 without having to make a request to web application 120.

Still referring to FIG. 1B, if the client then sends a request for "URL5" to web server 104, then web server 104 will check to see if resource 115, associated with "URL5," is cached in cache layer 103. Because cache layer 103 does not have resource 115 associated with "URL5" cached, web server 104 requests resource 115 from web application 120. Web application 120 returns resource 115 to web server 104. As illustrated in FIG. 1C, web server 104 then caches resource 115, associated with "URL5," in cache layer 103. Thus, any subsequent request for "URL5" before resource 115 expires will be fetched from cache layer 103 without involvement of web application 120.

Storing requested resources in cache layer 103 may save time for subsequent requests. However, one problem with this caching system is that the TTL value for a composite document is generally equal to the shortest TTL of the resources making up the composite document. If, for example, a composite document is composed of a video clip with a TTL of one week, a description of the video clip with a TTL of one week, and viewer commentary about the video clip with a TTL of five minutes, then the TTL of the composite document will be only five minutes. As a result, the entire document will be retrieved from the web application 120—rather than cache layer 103—once the document has been evicted from cache layer 103 after five minutes, though the video clip and the description of the video clip are technically unexpired and only the viewer commentary needs to be refreshed. Also, business logic running on web server 104 that processes the request for the composite document might be written to rebuild the entire composite document from the document's component parts after the document expires in the cache layer 103. Thus, the nature of this business logic running on web server 104 can result in unnecessary calls to web application 120 to fetch components of the composite document that have not expired.

Another problem with previous approaches is that if three different resources contain the same news story, but are indexed by different URLs, then the cache layer caches each resource separately, indexed by its respective URL. The result is that three separate instances of the same news story are held in the cache, which is a waste of cache space.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A-3D illustrate portions of example composite documents, according to an embodiment of the invention;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Figure 1A:
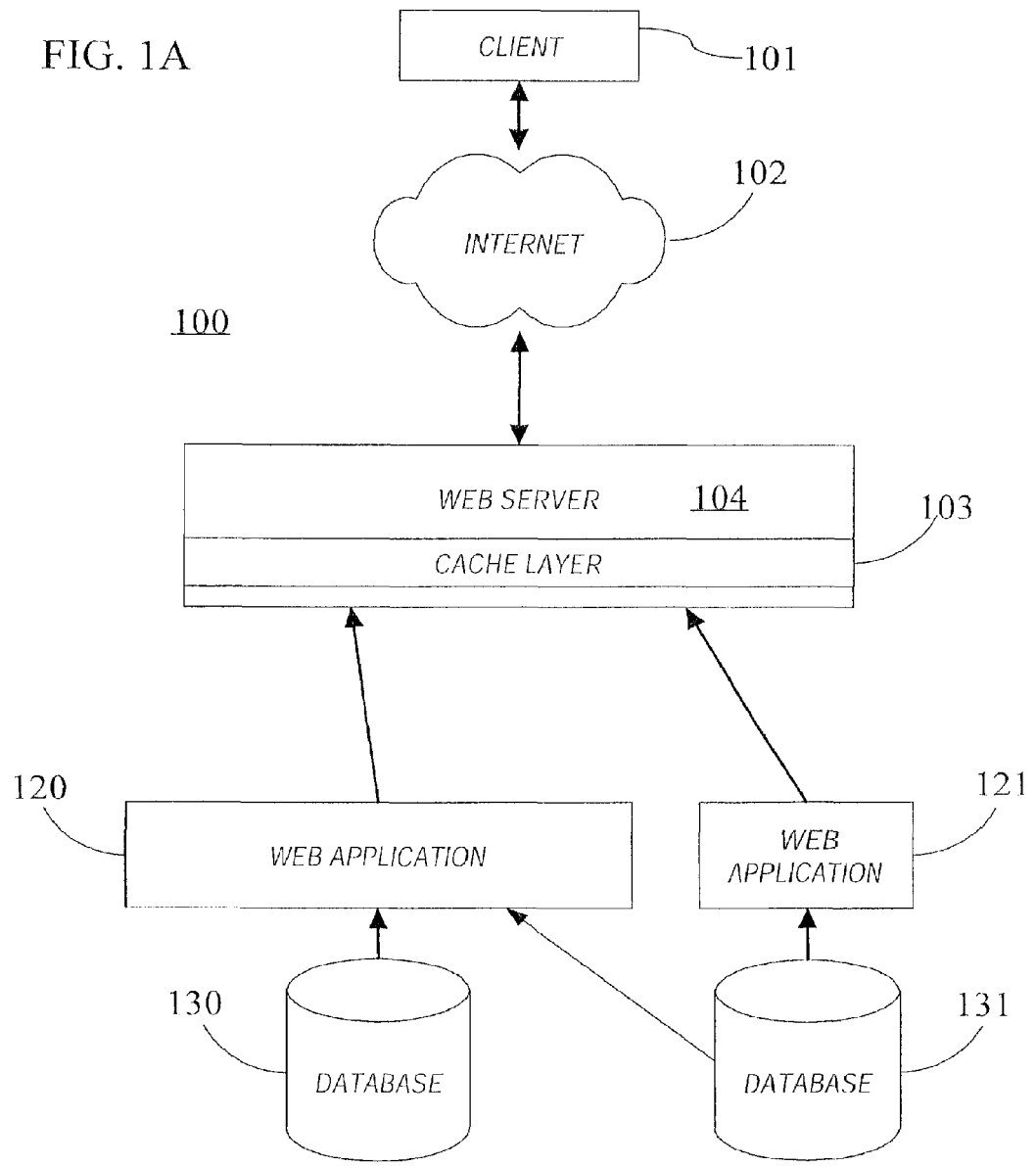
FIGS. 1A-1C are block diagrams that illustrate an example of a system in which documents are cached in and retrieved from a cache.
Figure 1B:
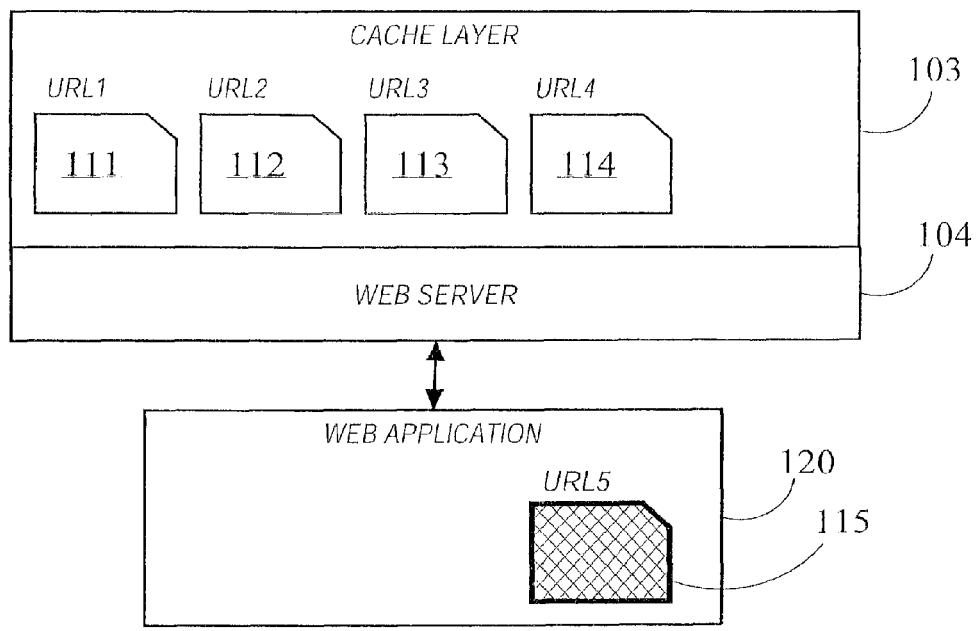
Figure 1C:
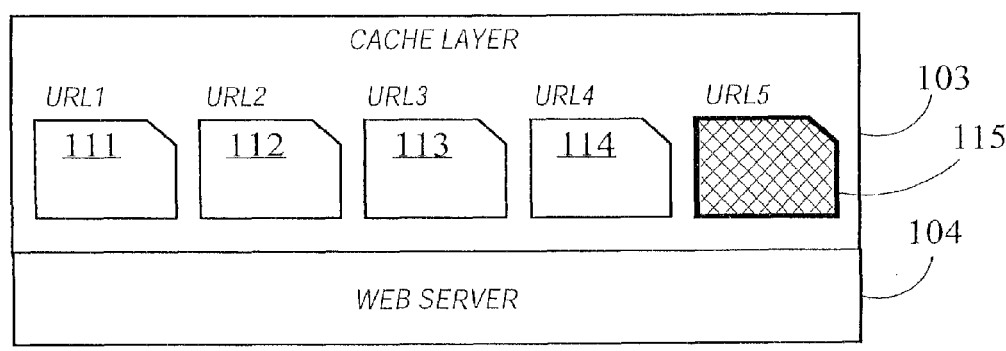
Figure 2:
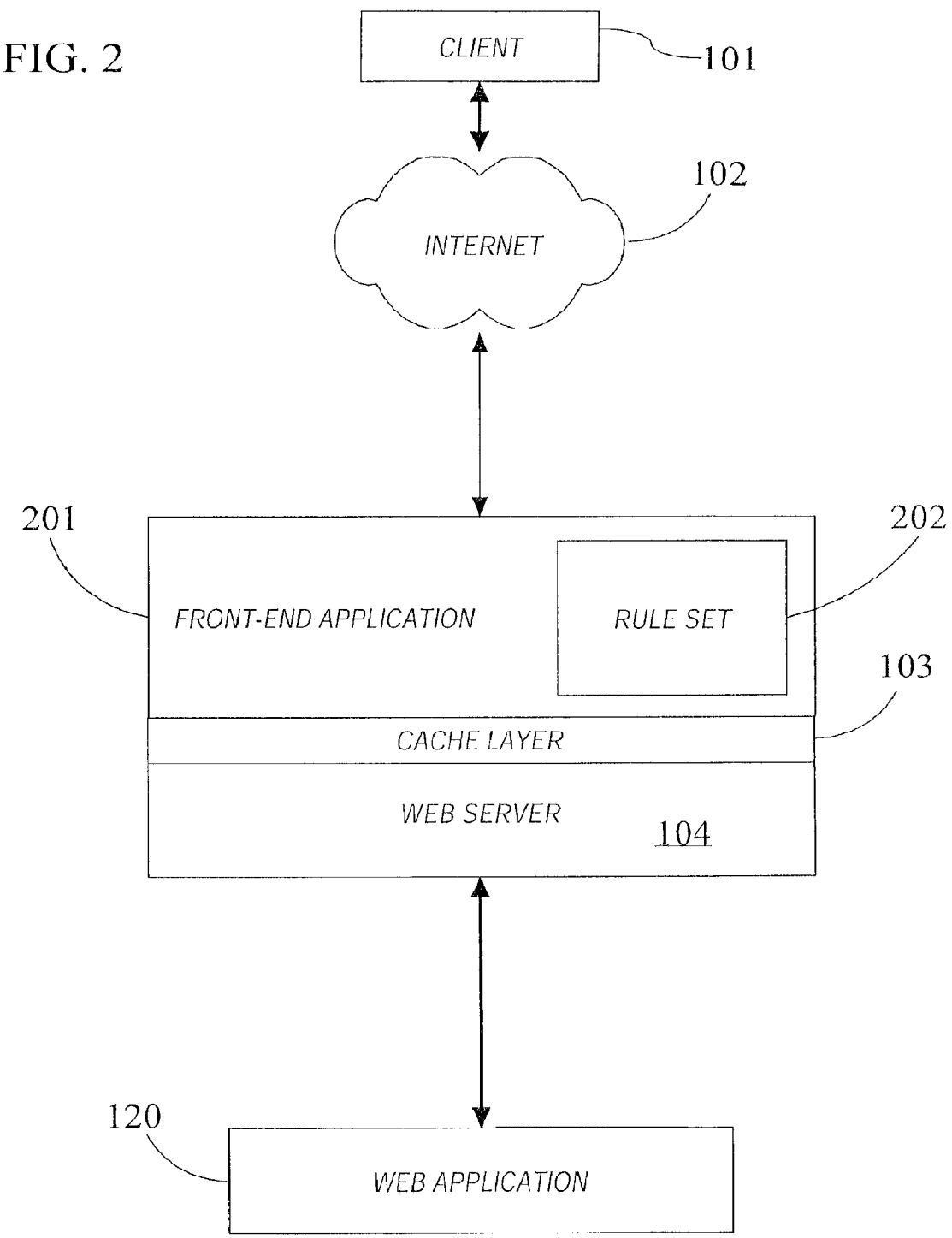
FIG. 2 is another block diagram that illustrates an example of a system, including a front-end application running on a web server, in which embodiments of the invention may be implemented and practiced.

One embodiment of the invention, illustrated in FIG. 2, comprises a front-end application 201—a thin layer of business logic—running on a web server 104. In another embodiment of the invention, front-end application 201 is implemented on a different machine from web server 104. In this embodiment, either front-end application 201 or web server 104 can have access to rule set 202.

Front-end application 201 receives URL requests sent to web server 104 from clients and resolves the URLs into URLs corresponding to component parts of the requested document according to the rules of a rule set 202. For example, composite document 300 in FIG. 3A comprises title 301, image 302, genre 303, director 304, user commentary 305, and critical acclaim 306 (resources 301-306). Front-end application 201 resolves a request for composite document 300 into URLs corresponding to resources 301-306. Front-end application 201 requests from web server 104 resources 301-306, and not composite document 300 itself. In another embodiment of the invention, front-end application 201 receives the component parts of composite document 300 fetched by web server 104 and uses a template associated with rule set 202 to construct composite document 300 from the component parts. Composite document 300 constructed by front-end application 201 is sent to client 101, which requested composite document 300. Client 101 knows the format of requests that can be properly interpreted according to the rules of rule set 202. Client 101 also knows the format of the response indicated by the template associated with rule set 202.

Thus, through use of rule set 202, front-end application 201 can be configured to cause web server 104 on which front-end application 201 runs to cache only the component parts of a composite document rather than the document as an indivisible whole. Caching the component resources of a composite document allows each component resource to be fetched only as often as the component resource's particular TTL indicates. Also, resources that are common to several different composite documents are not stored separately with each of the composite documents; a common resource is cached only once under its own component-specific URL. As such, these embodiments of the invention leverage the built-in capability of cache layer 103 with minimal overhead. Additionally, because rule set 202 is known to both front-end application 201 and client 101, configuration of rule set 202 allows for sophisticated handling of resource requests.

The Rule Set

All resources, including composite documents, are identified by a unique URL. Client 101 uses the URL of a resource to request the resource from web server 104, and in return client 101 receives a representation of the resource from web server 104. Each of documents 300, 310, 320, and 330 in FIGS. 3A-3D is associated with a unique URL. Additionally, these documents are related because each of them shows a different level of information about the same film: "A Cactus Blooms." In the case of composite documents 300, 310, 320, and 330, the associated URLs have a common base URL because documents 300, 310, 320, and 330 are related. A base URL of related composite documents is a part of the URL that each of the related documents 300, 310, 320, and 330 have in common. Thus, if the URL associated with document 300 is "http://yahoo.com/video/123?response=fullcommentary," the URL associated with document 310 is "http://yahoo.com/video/123?response=director, genre," the URL associated with document 320 is "http://yahoo.com/video/123," and the URL associated with document 330 is "http://yahoo.com/video/123?response=about," then one base URL common to the three documents is "http://yahoo.com/video/123." Also, "http://yahoo.com/video" and "http://yahoo.com" could be base URLs for documents 300, 310, 320, and 330.

Rule set 202 indicates which part of a URL corresponding to a composite document represents the component resources of the composite document. Rule set 202 also indicates the form for the URLs corresponding to those component resources. In one embodiment of the invention, front-end application 201 running on web server 104 has access to a configuration file that embodies rule set 202. In another embodiment of the invention, each base URL maps to a unique configuration file embodying rule set 202 rules pertaining to the particular URL. In yet another embodiment of the invention, one configuration file contains rule set 202 rules for multiple distinct base URLs. In such an embodiment, each base URL in the one configuration file maps to a portion of the configuration file with the rules pertaining to the particular URL. In each of these embodiments, configuration files have the capability to refer to rules in other configuration files.

Rule set 202 also defines a template of how to assemble the component resources of a composite document to form the composite document. In one embodiment of the invention, this template is in the same configuration file as the rules for resolving URLs from rule set 202. In another embodiment of the invention, the template couples each component resource of a composite document with an XQuery criterion identifying a position in an XML file. Front-end application 201 assembles the representations of the component resources in the XML file according to the template and returns the XML file to client 101 as the requested composite document. In another embodiment of the invention, the representation of the particular component resource returned by web server 104 is in XML.

In one embodiment of the invention, the web application 120, front-end application 201, and client 101 are Representational State Transfer (REST-based) web services, and the configuration files to which front-end application 201 has access—embodying the template and the rules of rule set 202 for resolving URLs—are written in an extension of the Web Application Description Language (WADL). WADL is a computer language that can be used to create a machine-readable definition of an interface like rule set 202. One of the advantages of this embodiment of the invention is that the implementation at front-end application 201 is obscured from client 101. This allows front-end application 201 or the configuration file to change as long as the interface used by client 101 as defined by rule set 202 remains the same.

Example Implementation

The following is an example configuration file (Table 1) containing the rule set rules for composite documents 300, 310, 320, and 330 of FIGS. 3A-3D. Following Table 1 is a description of how front-end application 201 would (a) use the rules in the configuration file to resolve requests for composite documents 300, 310, 320, and 330; and (b) use the template in the configuration file to assemble the pieces of the documents.

TABLE 1

EXAMPLE CONFIGURATION FILE

```
<resource xmlns:fc="http://frag-cache" path="/video/{id}">
    <param name="id" type="xsd:string" required="true" style="template"/>
    <method name="GET"
        fc:origin-decorators ="base"
        fc:origin-decorators-param="parts">
        <request>
            <param name="response" required="false" style="matrix"
                type="fc:multistring">
                <param-parts xmlns="http://frag-cache">
                    <param-part value="genre">
                        <resource-parts>
                            <resource-part origin-decorators="base"/>
                            <resource-part origin-decorators="genre"/>
                        </resource-parts>
                    </param-part>
                    <param-part value="director">
                        <resource-parts>
                            <resource-part origin-decorators="base"/>
                            <resource-part origin-decorators="director"/>
                        </resource-parts>
                    </param-part>
                    <param-part value="fullcommentary">
                        <resource-parts>
                            <resource-part origin-decorators="base"/>
                            <resource-part origin-decorators="genre"/>
                            <resource-part origin-decorators="director"/>
                            <resource-part origin-decorators="usercomments"
                                origin-url=
"http://vitality.yahoo.com/v1.5/comments?type=video&id={request.templa
te.id}&user={request.caller.id}"/>
                            <resource-part origin-decorators="critics"/>
                        </resource-parts>
                    </param-part>
                    <param-part value="about">
                        <resource-parts>
                            <resource-part origin-decorators="description"
                                origin-url=
"http://api.del.icio.us/v1/posts/get?url={request.url}"/>
                        </resource-parts>
                    </param-part>
                    <param-part value="base"/>
                </param-parts>
            </param>
        </request>
    </method>
</resource>
...
<representation status="200" mediaType="application/xml">
    <response-parts xmlns="http://frag-cache">
        <response-part xquery="//video/base" determinant="response:base"
            cache="true"/>
        <response-part xquery="//video/genre" determinant="response:genre"
            cache="true"/>
        <response-part xquery="//video/director"
            determinant="response:director" cache="true"/>
        <response-part xquery="//video/usercomments"
            determinant="response:usercomments" cache="true"/>
        <response-part xquery="//video/critics"
            determinant="response:critics" cache="true"/>
```

TABLE 1-continued

EXAMPLE CONFIGURATION FILE

```
        <response-part xquery="'//video/about"
                determinant="response:description" cache="true"/>
    </response-parts>
</representation>
...
```

The structure and implementation of the Configuration File of Table 1 is presented as a non-limiting example, though it could be structured and implemented any number of ways according to the embodiments of this invention. More specifically, the implementation of the Configuration File is inherently flexible to meet varying goals within the scope of the embodiments of the invention. The Configuration File of Table 1 is a fragment of a file written in an extension of WADL. Thus, the majority of the XML nodes in the Configuration File are found in the WADL specification. The "param-parts" and "response-parts" nodes and the children of those nodes comprise a portion of the extension to WADL. The "param-parts" node and the "representation-parts" node have an attribute, "xmlns='http://frag-cache,'" which indicates a name space from which definitions for the configuration file may be obtained. Extensions and implementations other than those shown may be made to WADL to facilitate the implementation of embodiments of this invention.

The Configuration File is mapped to the base URL "http://yahoo.com/video," as indicated by the "path" attribute of the "resource" node, "path='/video/{id}.'" However, this configuration file could also be mapped to any number of URLs such as "http://yahoo.com/video/123" or "http://yahoo.com." The specific mapping of the configuration files to base URLs is flexible according to the need of the situation. Because the Configuration File is mapped to "http://yahoo.com/video", rule set 202 embodied in the configuration file will be applied to any URL with that base. If a separate configuration file were mapped to "http://yahoo.com/video/123," then a request for a video with the id "123" would use the rules in the separate configuration file, and the requests with the base "http://yahoo.com/video" corresponding to any other video would map to the Configuration File. Thus, in one embodiment of the invention, front-end application 201 uses the most specific base URL found in the requested URL that maps to a configuration file.

Figure 4:
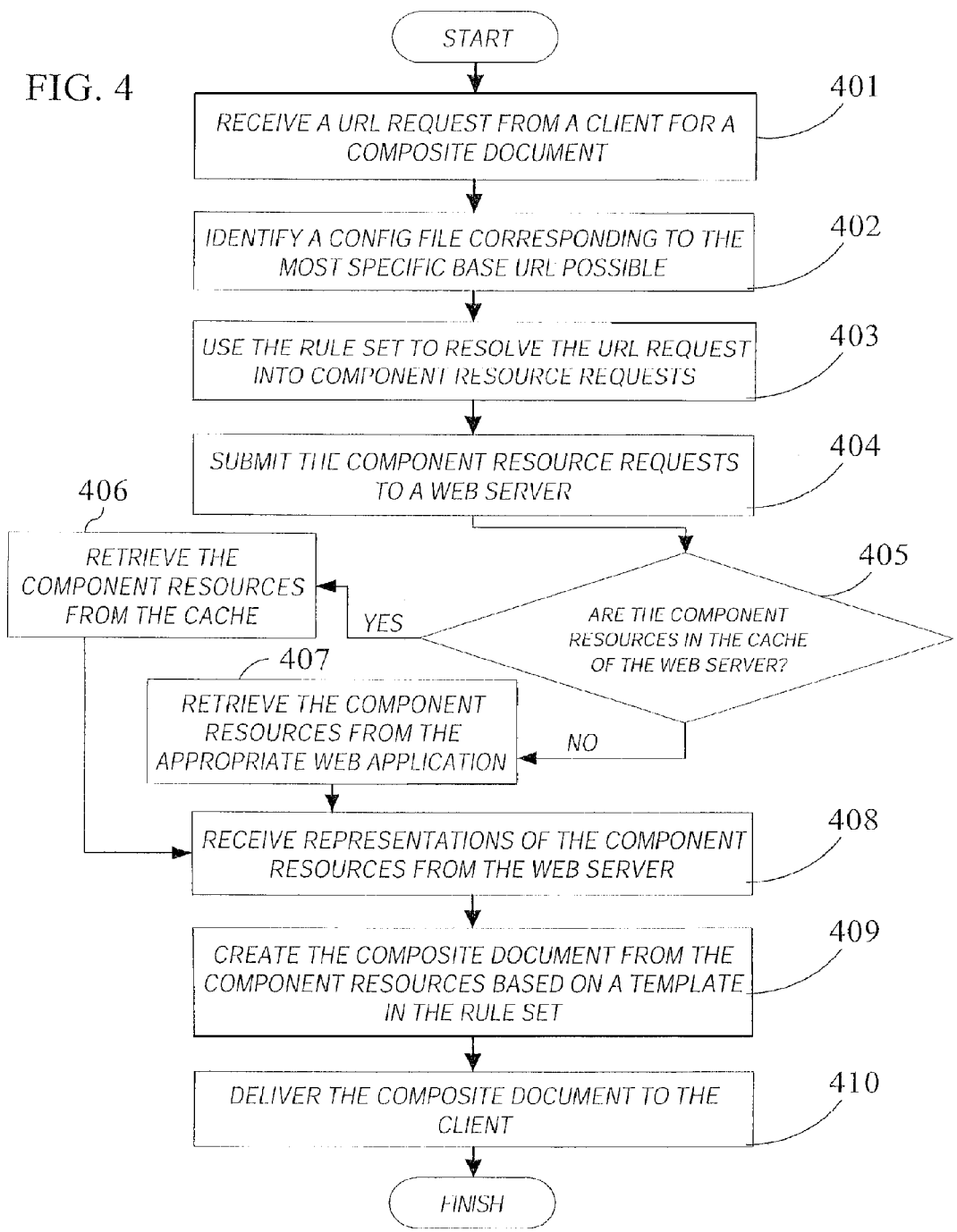
FIG. 4 is a flowchart that illustrates an example process of using a rule set to request the component resources of a composite document from a web server and assemble the component resources into the composite document, according to an embodiment of the invention.

Referring to the flowchart of FIG. 4, at step 401, client 101 sends the URL request "http://yahoo.com/video/123" to web server 104 with front-end application 201. Then, in step 402, front-end application 201 initiates identification of a configuration file that corresponds with a base of the URL, if any. Assuming that front-end application 201 has access to the Configuration File of Table 1, and no other configuration file maps to the more specific URL "http://yahoo.com/video/123," the application will identify the Configuration File of Table 1 as the applicable rule set 202.

The application then uses rule set 202 to resolve the URL request into component resource requests, as in step 403, by first identifying the portion of the configuration file that will be used to resolve the requested URL. Because the URL is a request to retrieve a resource, the pertinent method is "GET," which is identified in the "method" tag of the configuration file. The "method" tag has a two attributes, "fc:origin-decorators" and "fc:origin-decorators-param." The value of the "fc:origin-decorators" attribute, "base," defines the default set of resources to request from web server 104 when there are no parameters in the requested URL. The value of the "fc: origin-decorators-param" attribute is the name of the parameter to insert into the URLs of the component resources to be requested from web server 104. Thus, in the present example, front-end application 201 resolves the requested URL "http://yahoo.com/video/123" into "http://yahoo.com/video/123?parts=base" and sends that URL to web server 104, at step 404.

At step 405, web server 104 determines if a resource corresponding to "http://yahoo.com/video/123?parts=base" is in cache layer 103, as web server 104 would do with any other request for a resource. If the resource associated with the URL is cached and unexpired, then web server 104 sends the resource to front-end application 201 directly from the cache, in steps 406 and 408. If the resource is not cached or has expired, then web server 104 makes a request for the resource to the appropriate web application, as in step 407, and returns that resource to front-end application 201, in step 408. Thus, the web application returns the "base" information for the video, which comprises only title 301 and image 302, as in document 320 of FIG. 3C. This set of "base" information is programmed into web application 120, as are the responses to all other valid requests.

The front end application uses the template found in the Configuration File to format an XML response to client 101, in step 409. Specifically, front-end application 201 finds the "response-part" node corresponding to "base," which is the "response-part" node with the attribute "determinant" that has a value of "response:base" because "response" is the name of the parameter used to request the composite document comprising the resource. The "xquery" attribute of that "response-part" node indicates that the position of the representation of the resource received from web server 104 is "//video/base." The value immediately after the double-slash is defined by the XQuery criterion to be the root node of the subject XML file. Thus, the root node of the XML response document is "video," and the representation of the resource is to be placed under a child node of "video" called "base." The front-end application 201 creates the document prescribed by the template and returns the document to client 101, in step 410. Those of skill in the art will recognize that these implementation details can be varied while still being in keeping with the embodiments of this invention.

In a related example, client 101 requests the URL "http://yahoo.com/video/123?response=base" from web server 104. Again, the applicable method is GET because the URL is a request for a resource. However, unlike the previous example, the requested URL contains a parameter, "response=base," which instructs front-end application 201 to search for this parameter in the configuration file. In this example, the parameter consists of everything after the question mark in the requested URL, as is customary in REST-based applications, but those of skill in the art will understand that parameters can be indicated in URLs by other methods.

The "param" tag under the "method" tag describes the format of parameters that conform to rule set 202. The "param" tag indicates that the name of the parameter in the requested URL, "response," is a valid parameter name. Under the "param" node is a set of "param-part" nodes that indicate possible values that could be associated with the parameter name "response," according to rule set 202. Specifically, a URL parameter conforming to rule set 202 in the Configuration File could include "genre," "director," "fullcommentary," "base," or any combination of these values. In the instant example, the parameter is "response=base," which is a valid value. The "param-part" node corresponding to the value "base" does not have any child nodes, which indicates to front-end application 201 that the value, "base," is to be included in the URL to be sent to web server 104. Thus, front-end application 201 will resolve "http://yahoo.com/video/123?response=base" into "http://yahoo.com/video/123?parts=base." As in the previous example, "parts" is the name of the parameter to be included in the URL for the component resource that is to be sent to web server 104.

As with the preceding example, front-end application 201 submits "http://yahoo.com/video/123?parts=base" to web server 104, and web server 104 returns a representation of the corresponding resource. Also as before, front-end application 201 forms an XML document with "video" as the base node and "base" as a child node of "video," and includes the representation of the resource in the XML file under the "base" node. This XML document is then returned to client 101.

Figure 3A:
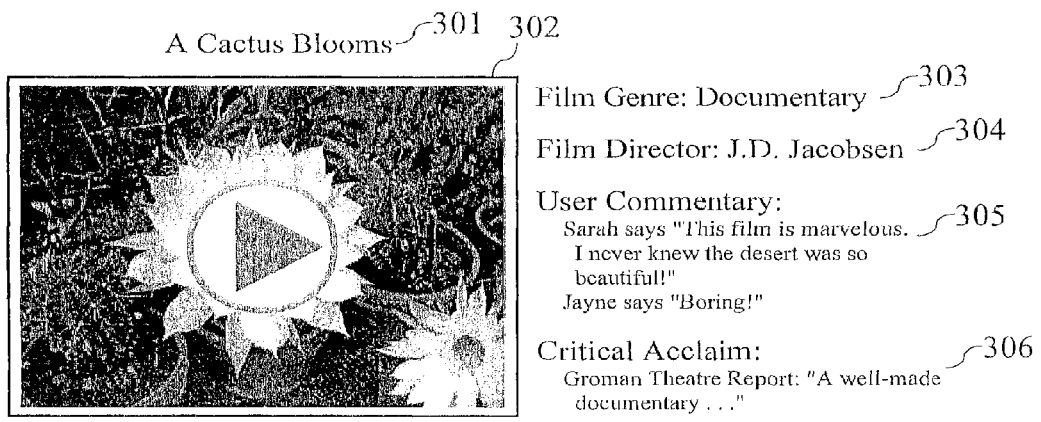

If front-end application 201 receives a request for "http://yahoo.com/video/123?response=fullcommentary," which represents the composite document 300 of FIG. 3A, then application 201 goes through a similar process as with the immediately preceding example. Front-end application 201 will identify the Configuration File to be the applicable rule set 202 because the base of the requested URL includes "http://yahoo.com/video." Application 201 parses out the parameter in the requested URL, "response=fullcommentary," and identifies "fullcommentary" to be a valid value for the parameter "response." However, unlike the previous example, the "param-part" node associated with the value "fullcommentary" has child nodes. These child nodes indicate that the URL containing the value "fullcommentary" as a parameter corresponds to a composite document comprising several resources. As such, the requested URL will be resolved into several URLs requesting the several component resources that make up the composite document.

In one embodiment of the invention, component resources of a composite document are requested from different web applications. For example, a "resource-part" node that has no "origin-url" attribute—such as those nodes under the "param-part" node corresponding to "fullcommentary" with the "origin-decorators" values of "base," "genre," "director," and "critics"—are requested using the same base URL as the original request. That base URL corresponds to a particular web application. Furthermore, those "resource-part" nodes having an "origin-url" attribute—such as the "resource-part" node corresponding to "usercomments"—are requested using the URL specified by the "origin-url" attribute. Thus, in response to the request for "http://yahoo.com/video/123?response=fullcommentary" mentioned above, front-end application 201 submits to web server 104 multiple requests corresponding to each of the "resource-part" nodes under the "param-part" node having the value of "fullcommentary": "http://yahoo.com/video/123?parts=base," "http://yahoo.com/video/123?parts=genre," "http://yahoo.com/video/123?parts=director," "http://yahoo.com/video/123?parts=critics," and "http://vitality.yahoo.com/v1.5/comments?type=video&id={request.template.id}& user={request.caller.id}." It will be understood by those skilled in the art that the above example is non-limiting and that rule set 202 can be configured in many ways to request and compile resources from one or many web applications.

Each of the component URLs corresponds to a unique component resource with a separate TTL value. The TTL value for each component resource is set by the web service from which the component resource originates. Thus, web server 104 deals with each resource separately; if a particular resource expires in the cache layer 103, then the cache layer 103 fetches only that particular resource. The resources are each delivered to front-end application 201 by web server 104. Front-end application 201 uses the template to formulate the composite document. As with the preceding examples, front-end application 201 creates an XML file with a root node "video." However, unlike with the preceding examples, front-end application 201 creates several child nodes under "video," as indicated by the Configuration File: "base," "genre," "director," "usercomments," and "critics." The representation for each corresponding resource is placed as a child node of the appropriate child of "video" to create the finished composite document to be returned to client 101.

Figure 3B:
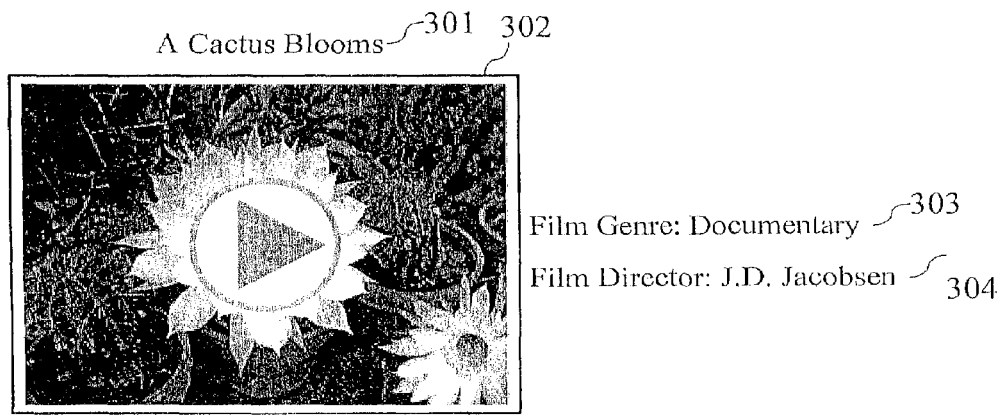

As a further example, client 101 requests "http://yahoo.com/video/123?response=director,genre," which represents composite document 310 of FIG. 3B. Front-end application 201 recognizes that "http://yahoo.com/video" is a base URL of the requested URL, which maps to the Configuration File of Table 1. The parameter in the URL, "response=director,genre," has two values for response, which indicates that client 101 is requesting the information corresponding to both "director" and "genre."

The values "director" and "genre" are both valid values of "response" under rule set 202 in the Configuration File. The "resource-part" nodes under the "param-part" node corresponding to "director" indicate that "base" and "director" are to be requested from web server 104. The "resource-part" nodes corresponding to "genre" indicate that "base" and "genre" are to be requested. In one embodiment of the invention, front-end application 201 requests the union of what is indicated by rule set 202. Thus, in the present example, application 201 will request "http://yahoo.com/video/123?parts=director," "http://yahoo.com/video/123?parts=base," and "http://yahoo.com/video/123?parts=genre" from web server 104.

As with the preceding examples, the resources returned by web server 104 are placed in an XML file according to the template in the Configuration File. Specifically, a root node "video" is formed, and child nodes "base," "director," and "genre" are formed under the root node. The representations of the requested resources are placed under the appropriate child nodes of the response XML comprising the composite document. The composite document is returned to client 101.

As a final example, client 101 requests "http://yahoo.com/video/123?response=about," which represents composite document 330 of FIG. 3D. Front-end application 201 recognizes that "http://yahoo.com/video" is a base URL of the requested URL, which maps to the Configuration File of Table 1. Application 201 parses out the parameter in the requested URL, "response=about," and identifies "about" to be a valid value for the parameter "response." The "param-part" node corresponding to "about" has child nodes including one "resource-part" node. This "resource-part" node has an "origin-url" attribute, which, as demonstrated above, indicates an absolute path with which to request the "resource-part" in which the "origin-url" attribute is found. This "resource-part" node is the only resource indicated that comprises the composite document "about." Thus, front-end application 201 resolves the requested URL into the URL of the "origin-url" attribute, which is "http://api.del.icio.us/v1/posts/get?url={request.url}."

Front-end application 201 submits "http://api.del.icio.us/v1/posts/get?url={request.url}" to web server 104, and web server 104 returns a representation of the corresponding resource. To form the composite document for return to client

101, front-end application 201 forms an XML document with "video" as the base node and "about" as a child node of "video," as indicated by the Configuration File of Table 1. The representation of the resource is included in the XML file under the "about" node. This XML document is then returned to client 101.

The above examples are non-limiting in that the examples illustrate the nuances of one implementation of front-end application 201 and rule set 202. Rule set 202 provides a known set of rules to client 101 and application 201 through which the advantages of the embodiments of the invention may be accomplished.

Hardware Overview

Figure 5:
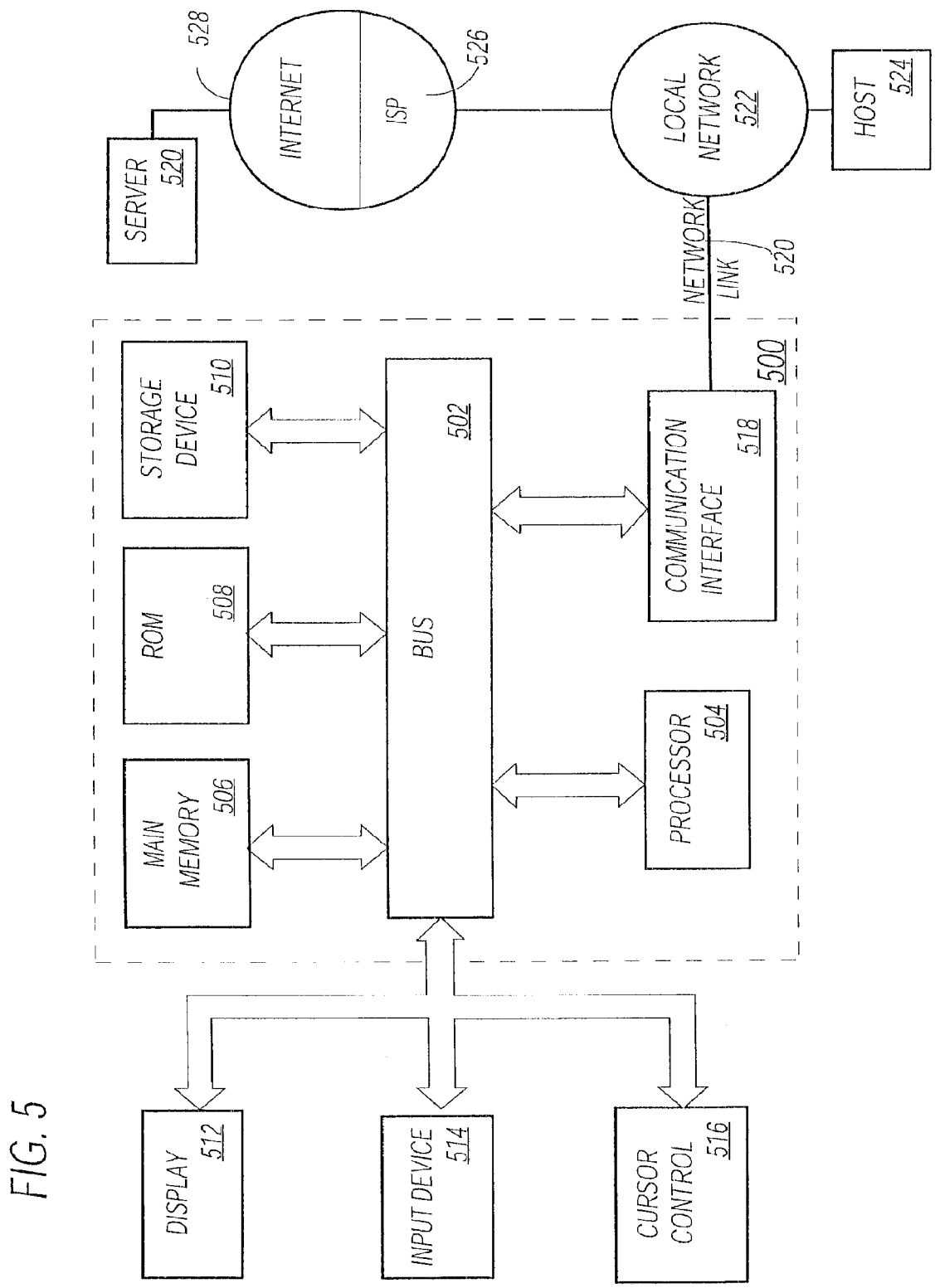
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising the steps of:
   receiving, from a client, a first request for a first resource, wherein the first request is formatted according to a plurality of rules;
   creating a second request for a component of the first resource according to the plurality of rules, wherein the component of the first resource is a second resource;
   submitting the second request to a server comprising a cache;
   receiving, from the server, a representation of the second resource;
   creating a third resource according to the plurality of rules, wherein the third resource comprises the representation of the second resource; and
   sending the third resource to the client;
   wherein the method is performed by a computing system.

2. The computer-implemented method of claim 1, wherein the first request comprises a base portion and a parameter; and
   wherein the step of creating a second request further comprises:
      identifying a particular rule, of the plurality of rules, corresponding to the parameter, wherein the particular rule couples the parameter with an alternative parameter; and
      pairing the base portion with the alternative parameter.

3. The computer-implemented method of claim 1, wherein the first request comprises a base portion and a parameter, the method further comprising identifying the plurality of rules based, at least in part, on the base portion.

4. The computer-implemented method of claim 1,
   wherein the plurality of rules is set forth in a configuration file; and
   wherein the configuration file at least in part conforms to Web Application Description Language (WADL).

5. The computer-implemented method of claim 1, wherein the representation of the second resource comprises Extensible Markup Language (XML).

6. The computer-implemented method of claim 5, wherein the step of creating the third resource further comprises the step of:
   creating an XML file comprising the representation of the second resource, wherein the placement of the representation of the second resource is indicated by the plurality of rules.

7. The computer-implemented method of claim 6, wherein the first resource comprises a set of component resources that includes the second resource, further comprising the steps of:
   creating a set of requests corresponding to the set of component resources;
   wherein the set of requests includes the second request;
   submitting the set of requests to the server;
   receiving, from the server, a set of representations corresponding to the set of component resources;
   creating the third resource according to the plurality of rules;
   wherein the third resource each representation of the set of representations; and
   wherein the third resource is an instance of the first resource.

8. The computer-implemented method of claim 7, further comprising caching a particular component resource of the set of component resources, wherein the particular component resource is cached separately from any other cached component resource in the set of component resources in the cache of the server, and has a corresponding time-to-live value in the cache of the server.

9. The computer-implemented method of claim 7, further comprising the steps of
   requesting, at the server, a first component resource of the set of component resources from a first web service; and
   requesting, at the server, a second component resource of the set of component resources from a second web service.

10. The computer-implemented method of claim 1, wherein a first configuration file comprises a first set of rules, of the plurality of rules, regarding creating the second request, and a second configuration file comprises a second set of rules, of the plurality of rules, regarding creating the third resource.

11. A computer-readable storage device storing one or more sequences of instructions which, when executed by one or more processors, cause the steps recited in claim 1.

12. A computer-readable storage device storing one or more sequences of instructions which, when executed by one or more processors, cause the steps recited in claim 2.

13. A computer-readable storage device storing one or more sequences of instructions which, when executed by one or more processors, cause the steps recited in claim 3.

14. A computer-readable storage device storing one or more sequences of instructions which, when executed by one or more processors, cause the steps recited in claim 4.

15. A computer-readable storage device storing one or more sequences of instructions which, when executed by one or more processors, cause the steps recited in claim 5.

16. A computer-readable storage device storing one or more sequences of instructions which, when executed by one or more processors, cause the steps recited in claim 6.

17. A computer-readable storage device storing one or more sequences of instructions which, when executed by one or more processors, cause the steps recited in claim 7.

18. A computer-readable storage device storing one or more sequences of instructions which, when executed by one or more processors, cause the steps recited in claim 8.

19. A computer-readable storage device storing one or more sequences of instructions which, when executed by one or more processors, cause the steps recited in claim 9.

20. A computer-readable storage device storing one or more sequences of instructions which, when executed by one or more processors, cause the steps recited in claim 10.

* * * * *